United States Patent [19]

Kimura

[11] Patent Number: 4,940,557
[45] Date of Patent: Jul. 10, 1990

[54] METHOD OF MANUFACTURING MOLDING MEMBERS

[75] Inventor: Kaoru Kimura, Yokohama City, Japan

[73] Assignee: Hashmoto Forming Industry Co., Ltd., Yokohama City, Japan

[21] Appl. No.: 289,831

[22] Filed: Dec. 27, 1988

[30] Foreign Application Priority Data

| Dec. 28, 1987 | [JP] | Japan | 62-333344 |
| Dec. 28, 1987 | [JP] | Japan | 62-333345 |
| Jan. 29, 1988 | [JP] | Japan | 63-19287 |
| Jan. 29, 1988 | [JP] | Japan | 63-19288 |

[51] Int. Cl.$^5$ .................. B29C 35/12; B28B 11/16
[52] U.S. Cl. .................... 264/26; 264/151; 264/163; 264/291; 264/296; 264/DIG. 46; 264/245; 425/174.8 E; 425/112; 425/296; 425/299
[58] Field of Search ............ 264/25, 26, 163, 148, 264/151, 327, 154, 245, DIG. 46, 288.4, 288.8, 291, 296, 292; 425/174.6, 298, DIG. 13, 298, 296, 174.8 E, 112

[56] References Cited

U.S. PATENT DOCUMENTS

| 2,510,383 | 6/1950 | Dalgleish | 264/26 |
| 2,791,801 | 5/1957 | Szantay | 264/25 |
| 3,444,275 | 5/1969 | Willett | 264/327 |
| 3,577,484 | 5/1971 | Jacobson | 264/327 |
| 4,154,893 | 5/1979 | Goldman | 264/327 |
| 4,250,612 | 2/1981 | Narita | 264/154 |
| 4,451,721 | 5/1984 | Nemeskeri | 264/163 |

FOREIGN PATENT DOCUMENTS

| 54-11977 | 1/1979 | Japan . | |
| 57-56214 | 4/1982 | Japan | 264/163 |
| 60-63132 | 4/1985 | Japan | 264/163 |
| 61-108027 | 5/1986 | Japan . | |
| 1376894 | 12/1974 | United Kingdom | 425/174.6 |

*Primary Examiner*—Jeffery Thurlow
*Assistant Examiner*—Mathieu Vargot
*Attorney, Agent, or Firm*—Stevens, Davis, Miller & Mosher

[57] ABSTRACT

A method of manufacturing molding members, for instance for automobiles, wherein an elongate shaped body is prepared from synthetic resin material either by an extrusion process, or by an injection process and is subjected to a controlled heating so as to soften the interior resin material while preserving the hardness of the outer surface portion. A cutter blade is advanced into the shaped body while it is subjected to the controlled heating, whereby the outer surface portion is urged and deformed inwardly to form a smooth end surface in continuous connection with remaining outer surface of the molding member.

7 Claims, 14 Drawing Sheets

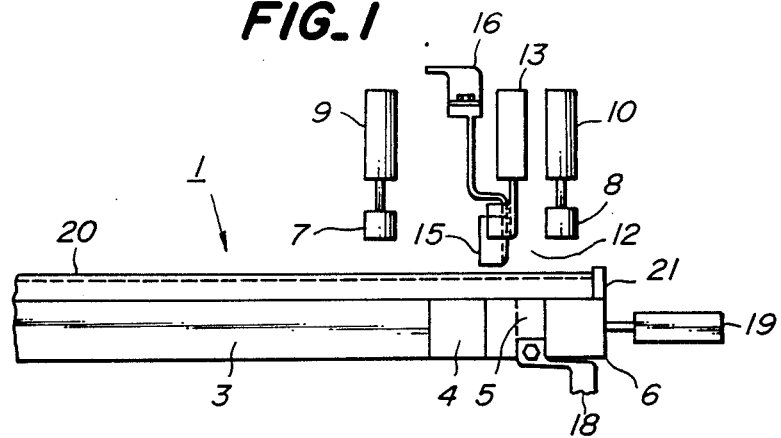
FIG_1
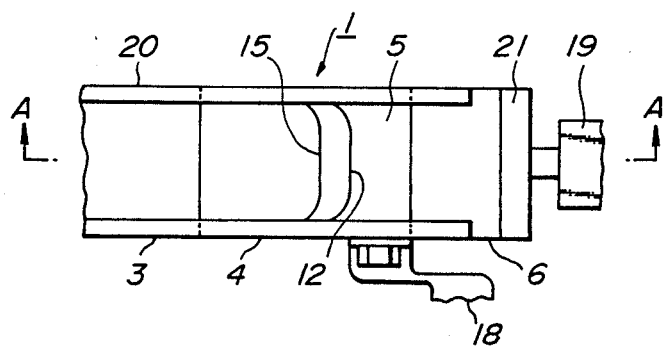
FIG_2
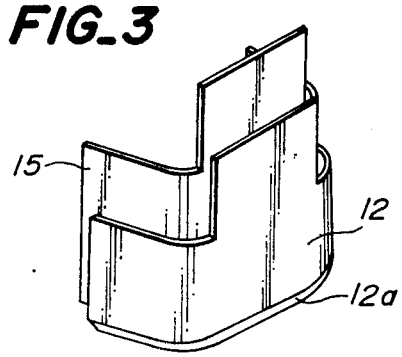
FIG_3

FIG_4
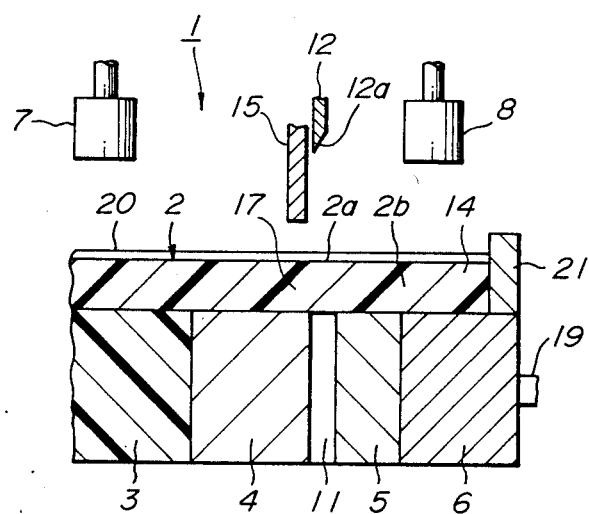
FIG_5
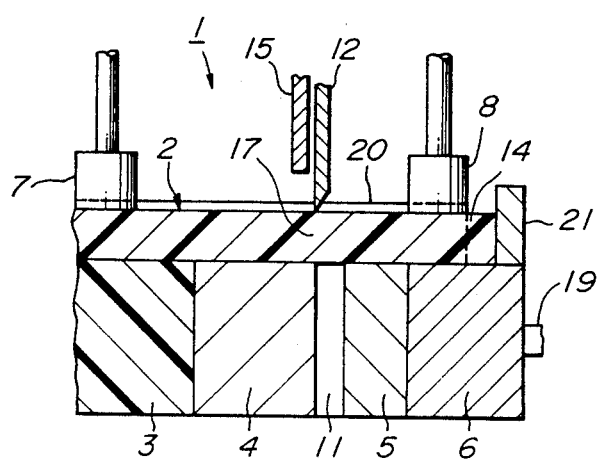

FIG_6
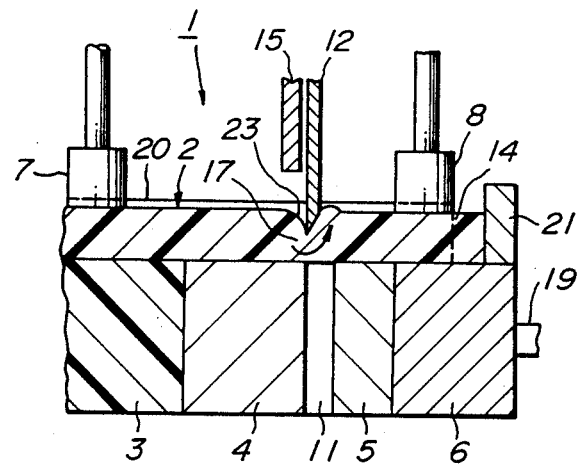
FIG_7
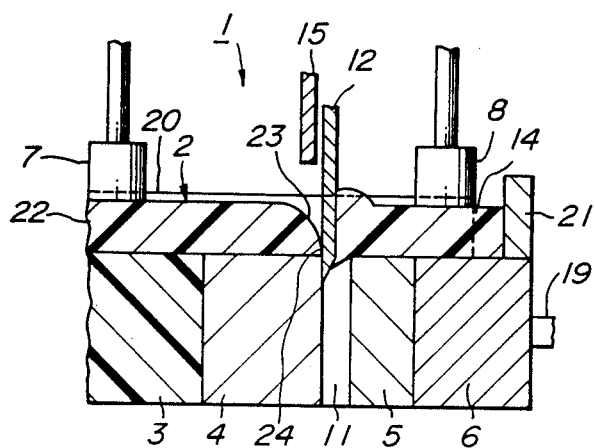

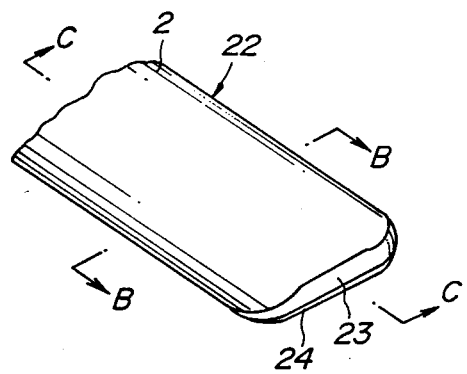
FIG_8
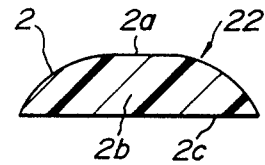
FIG_9
FIG_10
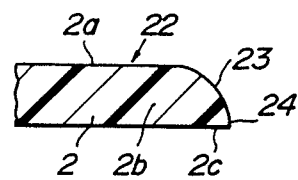
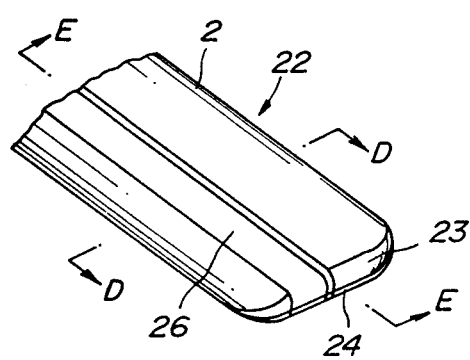
FIG_11
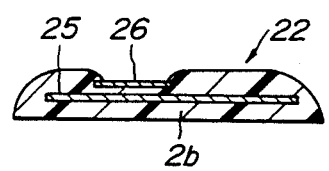
FIG_12
FIG_13
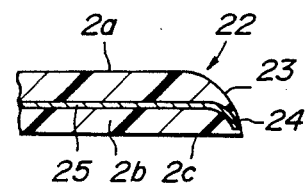

FIG_14
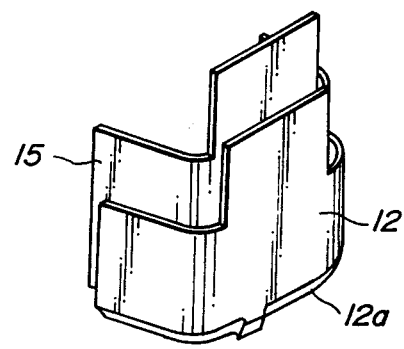
FIG_15
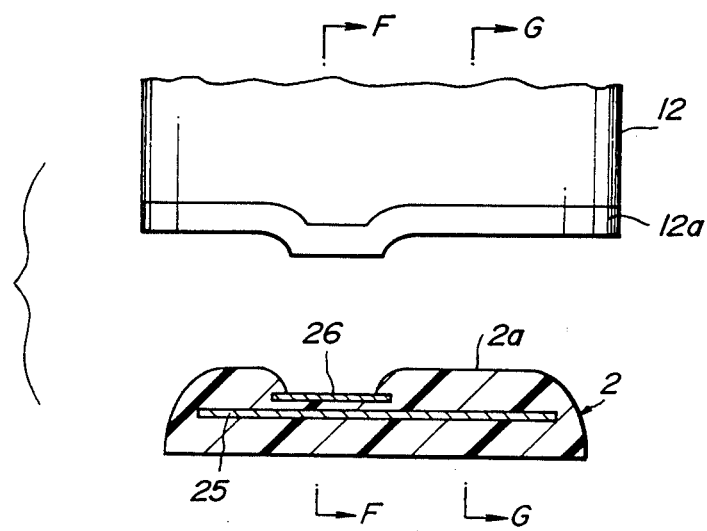

FIG_16
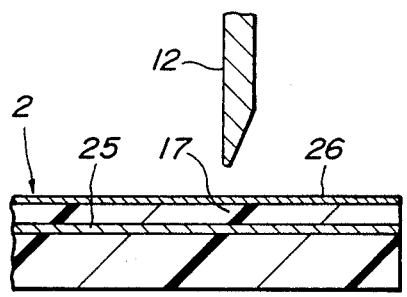
FIG_17
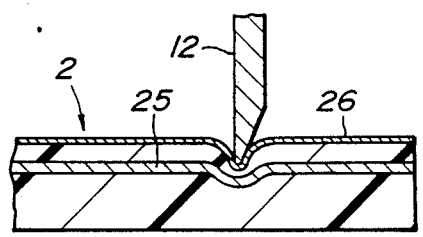
FIG_18
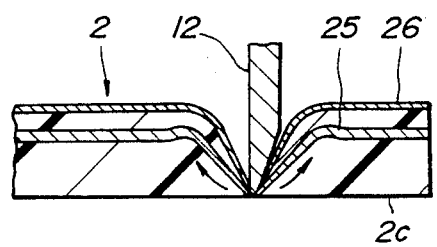

FIG_22
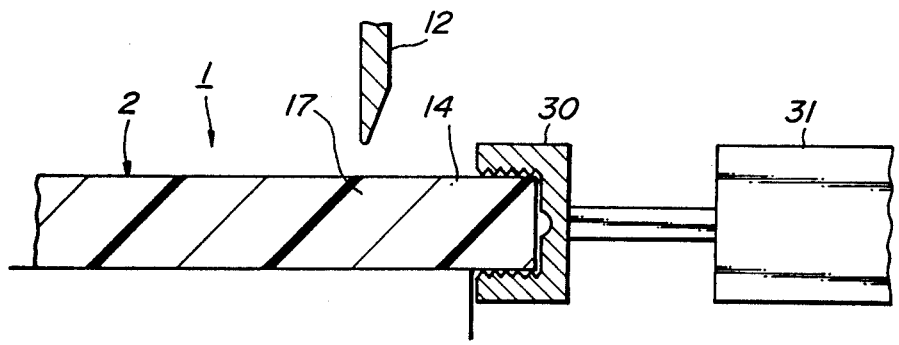
FIG_23
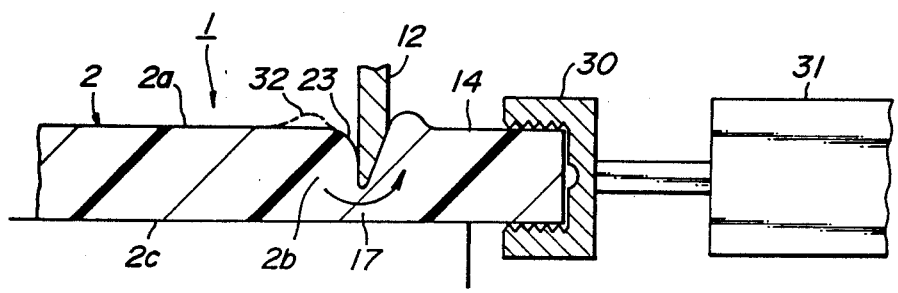
FIG_24
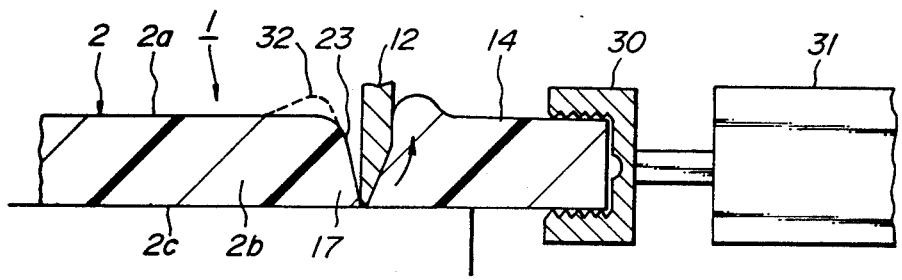

FIG_30A
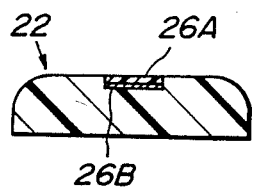
FIG_30B
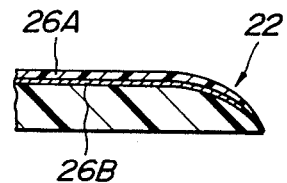
FIG_31A
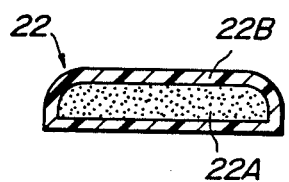
FIG_31B
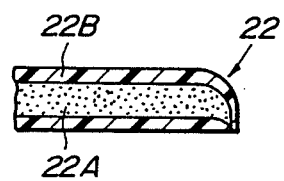
FIG_32A
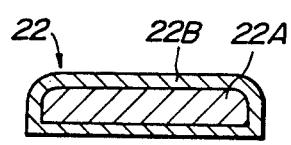
FIG_32B
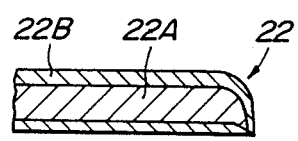
FIG_33A
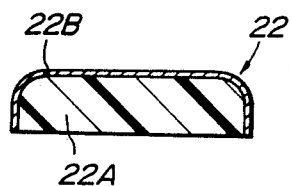
FIG_33B
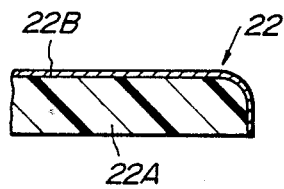

FIG_39
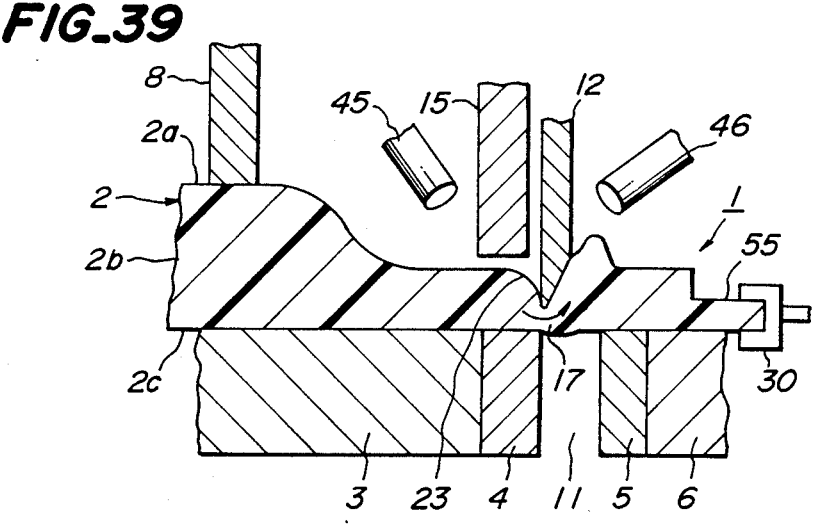
FIG_40
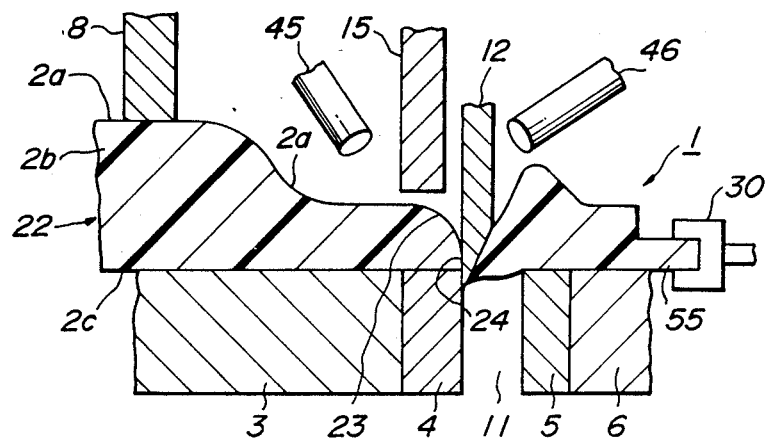
FIG_41
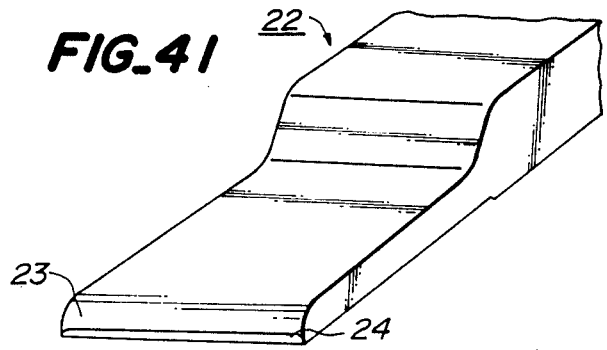

METHOD OF MANUFACTURING MOLDING MEMBERS

BACKGROUND OF THE INVENTION

1. Field of the Invention

The present invention relates to a method of manufacturing molding members composed of a thermoplastic synthetic resin material.

2. Description of the Related Art

In order to manufacture molding members, typically for automobiles, it is generally known to mold the resin material, either by an injection process or by an extrusion process, into an elongate shaped body with a cross-section corresponding to that of the molding member, and to cut the shaped body on at least one end into a predetermined length of the molding member. However, the resultant cut surface is left on the molding member as being clearly visible and accessible from outside when the molding member is mounted in place. Such a cut surface not only degrades the appearance but also acts as a possibly harmful edge. It has thus been a conventional practice to carry out an appropriate terminal end treatment, e.g. by covering the cut surface with an end cap, which necessitates troublesome and time consuming production steps, and which is thus quite disadvantageous.

To eliminate the above-mentioned terminal end treatment thereby to improve the productivity, there has been a proposal wherein an elongate shaped body formed of a synthetic resin material is cooled down at first, and is then subjected to cutting by means of a cutting blade to which a high frequency voltage is applied (cf. Japanese Patent Application Laid-open Publication Nos. 54-11,977 and 61-108,027). With such a cutting process, however, the resin material in contact with, or in the vicinity of, the cutting blade is subjected to a melt-down to form a cut surface which is significantly distinct in the appearance from the remaining outer surface of the molding member. Moreover, as the blade is brought into contact with the molten resin material during the cutting, it is quite difficult to form a smooth and even cut surface and to achieve a refined appearance.

SUMMARY OF THE INVENTION

Therefore, an object of the present invention is to provide an improved method of manufacturing molding members which makes it possible to eliminate the drawbacks of the prior art as mentioned above.

According to the present invention, there is provided a method of manufacturing molding members composed of a thermoplastic synthetic resin material, comprising the steps of forming said resin material into a shaped elongate body with a cross-section corresponding to that of the molding member, and cutting the shaped body on at least one end into a predetermined length of the molding member, wherein said shaped body is subjected to such a controlled heating that the shaped body has its interior portion whose resin material is heated above the softening point temperature thereof, so that its outer surface portion becomes higher in hardness than said interior portion, and wherein a cutter blade is advanced into the shaped body while it is subjected to said controlled heating, so as to form a longitudinal end surface substantially exclusively by said outer surface portion, and a cut surface which is arranged on a substantially rear side of said shaped body.

The present invention is based on a recognition that the drawbacks of the prior art as mentioned above can be eliminated by forming a curved end region which is continuous with the remaining outer surface of the molding member.

More particularly, according to the present invention, the cutter blade is advanced into the shaped body while it is subjected to a controlled heating to have its interior resin material heated above the softening temperature of the resin material, and to thereby form an outer surface portion which becomes higher in hardness than the interior resin material. By this, the outer surface portion with a sufficient hardness is forced by the cutting blade inwardly, without being cut away or ruptured by the blade, inducing a plastic flow of the interior resin material in its molten state. By further advancing the cutter blade inwardly, there is formed a curved end surface of the molding member substantially exclusively by the outer surface portion, which is continuous with the remaining outer surface of the molding member, and the outer surface portion is subsequently cut away. The cut surface has a minimized surface area, where the outer surface portion substantially completely covers the interior resin material, and is arranged substantially on the rear side of the molding member so that it is not visible from outside when the molding member is mounted in place. This makes it possible to readily realize a refined appearance of the molding member withour requiring a separate terminal end treatment and, hence, with an improved productivity.

The present invention may be carried out using appropriate thermoplastic synthetic resin material, such as styrene resin, vinylchloride resin, polyolefin resin, or the like. The elongate shaped body may be molded from the resin material either by an injection process or by an extrusion process.

In one advantageous embodiment of the present invention wherein the elongate shaped body is formed by an injection process, the shaped body as molded has at least one longitudinal end region with a constant cross-section to which the cutting is effected.

In another advantageous embodiment of the present invention wherein the shaped body is formed by an extrusion process, the interior resin material and the outer surface portion of the shaped body are different in material from each other.

While the controlled heating of the shaped body may be effected either in an oven or by using far-infrared radiation, it is advantageous to heat the interior resin material by a high frequency dielectric heating and to cool the outer surface portion simultaneously, for example by supplying ambient air at a normal room temperature as a cooling medium.

The cutting blade, which need not be heated in the present invention, is also preferably cooled so as to be maintained at a constant temperature. The speed with which the cutter blade is advanced into the shaped body should be such that the outer surface portion is prevented from being prematurely cut away until the desired end surface is completely formed.

Advantageously, the shaped body is applied with a tension while the cutter blade is advanced into the shaped body. This serves to provide a refined appearance of the molding member in a positive and reliable manner, by effectively preventing or at least mitigating formation of undesirable bulges on the outer surface of the molding member and in the vicinity of the longitudinal end thereof, which otherwise tend to be formed as a result of an outward plastic flow of the interior resin material.

BRIEF DESCRIPTION OF THE DRAWINGS

FIGS. 1 and 2 are front view and top plan view, respectively, of one preferred embodiment of the cutting device which may be used to carry out the method according to the present invention;

FIG. 3 is a perspective view of the cutting blade used in the cutting device of FIGS. 1 and 2;

FIGS. 4 to 7 are sectional views taken substantially along the line A—A in FIG. 2 and showing in detail successive operations of the cutting device of FIGS. 1 and 2;

FIG. 8 is a perspective view showing the longitudinal end region of the molding member produced by the method according to one embodiment of the present invention;

FIGS. 9 and 10 are sectional views taken substantially along the lines B—B and C—C in FIG. 8, respectively;

FIG. 11 is a perspective view showing the longitudinal end region of the molding member produced by the method according to another embodiment of the present invention;

FIGS. 12 and 13 are sectional views taken substantially along the lines D—D and E—E in FIG. 11, respectively;

FIG. 14 is a perspective view showing the cutting blade used to produce the molding member of FIGS. 11 to 13;

FIG. 15 is a sectional view also taken substantially along the line D—D in FIG. 11 and showing the manner of cutting with the blade of FIG. 14;

FIGS. 16 to 18 are sectional views taken substantially along the line F—F in FIG. 15, respectively, and showing successive operations of the cutting blade of FIG. 14;

FIGS. 22 to 24 are sectional views showing the manner of carrying out the cutting step in a method according to another embodiment of the present invention;

FIGS. 30A, 31A, 32A, and 33A are cross-sectional views showing various examples of the molding member manufactured by using an extrusion process;

FIGS. 30B, 31B, 32B and 33B are longitudinal-sectional views thereof;

FIGS. 38 to 40 are sectional views showing the manner of carrying out the cutting step with respect to the shaped body of FIGS. 36 and 37; and FIG. 41 is a fragmentary perspective view of the molding member manufactured by using injection process.

DETAILED DESCRIPTION OF THE PREFERRED EMBODIMENTS

Figure 19:
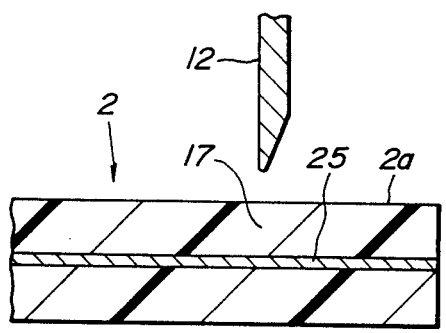
FIGS. 19 to 21 are sectional views taken substantially along the line G—G in FIG. 15, respectively, and showing successive operations of the cutting blade of FIG. 14.
Figure 20:
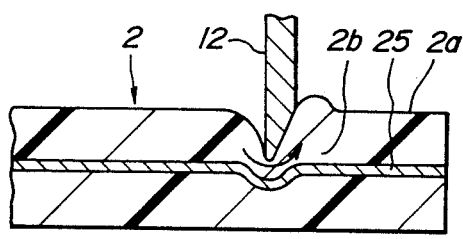
Figure 21:
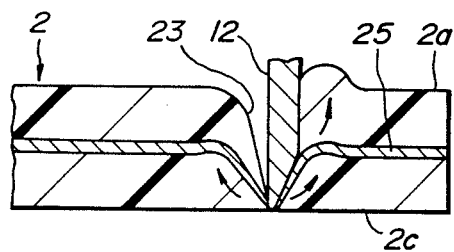

The present invention will be further explained hereinafter, by referring to some preferred embodiments shown in the attached drawings, in which same reference numerals are used to designate identical or equivalent elements.

The method of manufacturing molding members in accordance with the present invention includes an initial step of molding a thermoplastic synthetic resin material into an elongate shaped body having a cross-section corresponding to that of the molding member. The shaped body can be formed either by an injection process or by an extrusion process in a manner known, per se, for which a detailed explanation will not be required.

The method of the present invention further includes a subsequent step of cutting the shaped body on at least one longitudinal end thereof into a predetermined length of the molding member, by using a cutting device to be described below.

More particularly, there is shown in FIGS. 1 and 2 a cutting device which as a whole is designated by reference numeral 1, and which is suitable to effect the desired cutting operation on one end of the shaped body 2 made of a synthetic resin material, from which the molding member is formed. The cutting device 1 as shown includes an elongate support member 3 made of a fiber-reinforced plastic (FRP) material, a cutter die 4 made of a ceramic material, an earth electrode 5 in the form of a copper block connected to ground, as well as a short support member 6 made of a ceramic material. These elements 3 to 6 are arranged with the above-mentioned sequence in the longitudinal direction, and aligned with each other to define a horizontal upper surface for supporting the shaped body 2 thereon. The cutting device 1 further includes clamp jaws 7, 8, which are arranged above the support members 3, 6 and connected to pneumatic or hydraulic actuators 9, 10, respectively. These clamp jaws 7, 8 are movable toward and away from the respective support members 3, 6. A gap 11 may be formed between the cutter die 4 and the earth electrode 5, and a cutter blade 12 is arranged between the clamp jaws 7, 8 and opposite to the gap 11.

The cutter blade 12 is adapted to cooperate with the cutter die 4 to cut the shaped body 2 therebetween. To this end, the cutter blade 12 is connected to a pneumatic or hydraulic actuator 13, and is movable toward and away from the cutter die 4. As shown in FIGS. 2 and 3, the cutter blade 12 has a contour corresponding to the cut profile of the molding member, and is formed of an appropriate material, such as ceramic material or non-magnetic metal with a ceramic-coated layer. Preferably, the cutter blade 12 has a slant end surface 12a which faces to the end portion 14 of the shaped body 2 to be cut away, as well as a flat and smooth tip without excessive sharpness. Furthermore, the cutter blade 12 may have a coated surface layer of polytetrafluoroethylene (PTFE) to minimize the sliding resistance.

A high frequency electrode 15 made of copper is fixedly arranged above the die 4 and in contact with the cutter blade 12. This electrode 15 is connected to a high frequency voltage source 16 to apply high frequency voltage across the two electrodes 5, 15, such that the shaped body 2 is subjected to a high frequency dielectric heating in its cut region 17 where the cutting is to be effected. The cutter blade 12 is movable along the high frequency electrode 15 toward and away from the shaped body 2. Thus, the die 4 and the gap 11 each has a contour which permits the movement of the cutter blade 12 mentioned above. The cutting device 1 further includes an earth connection cable 18 to which the earth electrode 5 is connected, a pneumatic or hydraulic actuator 19 for adjusting the longitudinal position of the short support member 6 relative to the elongate support member 3, a pair of elongate side guide members 20 fixedly connected to the elongate support member 3 on both side edges thereof, and extending over the short support member 6, as well as a stopper member 21 arranged on the end portion of the short support member 6 remote from the elongate support member 3.

With the cutting device 1 of the structure as explained above, the required cutting is effected with respect to the shaped body 2 in the following manner. Referring to FIG. 4, the shaped body 2 molded from a resin material is mounted on the support surface of the device 1, and positioned by the side guide members 20 and the stopper member 21. The longitudinal position of the short support member 6 is assumed to have been already adjusted by operating the actuator 19 according to the length of the molding member, or to the length of that portion of the shaped body 2 which is to be cut away. The actuators 9, 10 are then operated so that the shaped body 2 is clamped between the jaws 7, 8 and the support members 3, 6 on both sides of the cutter blade 12, as shown in FIG. 5.

Subsequently, high frequency voltage is applied across the electrodes 15, 5 to subject the resin material of the shaped body 2 to a high frequency dielectric heating near its cut region 17. Consequently, the resin material forming the outer surface portion 2a and the interior portion 2b of that region 17 is uniformly heated above a normal room temperature, while the outer surface portion 2a is at the same time cooled by ambient air at the normal room temperature. This means that the outer surface portion 2a can be placed at a relatively lower temperature as compared with the interior portion 2b. In other words, the shaped body 2 can be subjected to a "controlled heating", with the interior portion 2b heated above the softening temperature of the resin material, while simultaneously preserving a desired hardness of the outer surface portion 2a.

The actuator 13 is now operated to advance the cutter blade 12 toward the shaped body 2, as shown in FIGS. 5 to 7, maintaining the controlled heating of the shaped body 2. Since the outer surface portion 2a of the shaped body 2 is relatively higher in hardness than the interior portion 2b, the outer surface portion 2a is stretched and urged inwardly by the cutter blade 12 as the latter is further advanced into the shaped body 2, as shown in FIG. 6, without being prematurely cut away or ruptured by the blade 12. The outer surface portion 2a urged inwardly as above induces a plastic flow of the interior resin material, which is indicated by an arrow shown in FIG. 6 below the cutter blade 12. At this stage, the interior resin is "squeezed" by the cutter blade 12 and guided so as to flow along its slant surface 12a opposite to said end region 14 of the shaped body 2, which is to be eventually cut away. By further advancing the cutter blade 12 inwardly, the outer surface portion 2a of the shaped body 2 in its cut region 17 is deformed into a smoothly curved configuration, as shown in FIG. 7, and is then cut away to form a desired molding member 22.

As particularly shown in FIGS. 8 to 10, the molding member 22 manufactured as above has a curved end surface 23 in continuous connection with remaining outer surface region thereof, and a cut surface 24 formed by the blade 12. The cut surface 24 is composed of the resin material forming the outer and rear surface portions 2a, 2c of the molding member 22, which are tightly welded to, or fused with each other to prevent the interior resin material from being exposed outside. Moreover, the cut surface 24 is arranged adjacent to the rear side of the molding member 22; hence, it is not clearly visible from outside when the molding member is mounted in place. Thus, the molding member 22 produced as above in accordance with the present invention provides a refined appearance and can be used as it is, without requiring a terminal end treatment to the cut surface 24, by means of an end cap or the like.

Another preferred embodiment of the present invention will be briefly explained hereinafter, with reference to FIGS. 11 to 21. This embodiment differs basically from the previous one in that, as shown in FIGS. 11 to 13, the elongate shaped body 2 or the molding member 22 includes additional elements, i.e. a core element 25 and an ornamental film 26. The core element 25 is embedded in the resin material of the shaped body 2, and may be formed of a strip-like sheet of synthetic material with a low elongation, such as polyethyleneterephthalate (PET) resin, or of a strand of fibers with a low elongation, such as glass fibers. The ornamental film 26 has a desired color, and is arranged on the outer surface portion 2a and formed of a PVC sheet or the like. The cutter blade 12 has a tip with a profile which, as shown in FIGS. 14 and 15, is complementary to the contour of the shaped body 2.

The cutting is carried out essentially in the manner as described previously, with the shaped body 2 subjected to the controlled heating and the cutter blade 12 advanced gradually into the shaped body 2, in a sequence as shown in FIGS. 16 to 18 and FIGS. 19 to 21. On this occasion, the core element 25 and the ornamental film 26 are also stretched and urged by the cutter blade 12 without being prematurely cut away or ruptured by the blade 12, until they are brought into tight contact with the outer and rear surface portions 2a, 2c. The cut surface 24 is eventually formed near the rear surface portion 2c, and consists of the outer and rear surface portions 2a, 2c as well as the core element 25 and the ornamental film 26, all of which are welded to, or fused with each other.

The molding member 22, when mounted in place, provides a refined appearance in that the ornamental film 26 extends continuously into the longitudinal end 23 of the molding member 22, and further in that the cut surface 24, including the core element 25 and the ornamental film 26, and arranged near the rear surface portion 2c, is not remarkable from outside.

Advantageously, the core element 25 is composed either of a transparent material, or of a material which is substantially the same in color with the resin material of the shaped body 22 itself, since the core element 25 then appears on the cut surface 24 of the molding member 22 less remarkably even when it is exposed outside.

The above-mentioned embodiments of the present invention may be carried out particularly advantageously, when the elongate shaped body 2 is applied with a tension in its longitudinal direction, during the cutting step. More specifically, referring to FIGS. 1 and 2, the actuator 19 connected to the short support member 6 for its longitudinal adjustment relative to the elongate support member 3 may be operated during the cutting step so as to gradually increase the size of the gap 11 or the distance between the two support members 3, 6. In this case, the clamp jaw 8 above the longitudinally movable support member 6, together with its associated actuator 10, may be connected to the support member 6 so that the tension can be applied to the shaped body 2 as clamped between the support member 6 and the clamp jaw 8.

Preferably, the tension has an intensity which decreases gradually in accordance with the progress of the cutting step. Application of the tension to the shaped body 2 may be stopped before completion of the cutting step. Furthermore, the tension may be applied to the shaped body 2 whenever appropriate, i.e before or after the cutter blade 12 comes into contact with the shaped body 2 or simultaneously therewith.

By applying the tension to the shaped body 2 during the cutting step, the plastic flow of the interior resin material of the shaped body 2 is directed toward the end region 14 to be cut away, and it is thus possible positively to prevent undesirable bulge-formation near the longitudinal end surface 23 of the molding member 22, and to readily provide a refined appearance of the product.

Another embodiment of the present invention, in which the elongate shaped body 2 is applied with a tension during the cutting step, will be briefly explained hereinafter with reference to FIGS. 22 to 24. In the present embodiment, the cutting device includes a chuck 30 adapted to clamp that longitudinal end region 14 of the elongate shaped body 2 which is to be eventually cut away, as well as a pneumatic or hydraulic actuator 31 connected to the chuck 30. In operation of the cutting device, the shaped body 2 is tightly clamped by the chuck 30 at its end region 14, and the actuator 31 is subsequently operated to apply the shaped body 2 with a tension. This makes it possible to positively prevent formation of undesirable bulge 32 near the end surface 23 of the molding member 22, and readily provide a refined appearance of the product.

In all the embodiments of the present invention thus far explained, the elongate shaped body 2 may be formed either by an extrusion process or by an injection process, as mentioned above.

Figure 25:
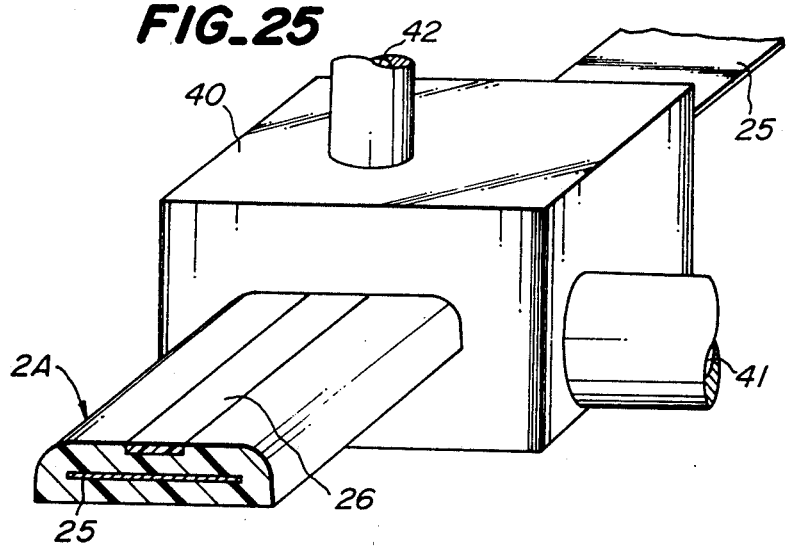
FIG. 25 is a perspective view showing an example of extrusion die block adapted to prepare the elongate shaped bodies.
Figure 26:
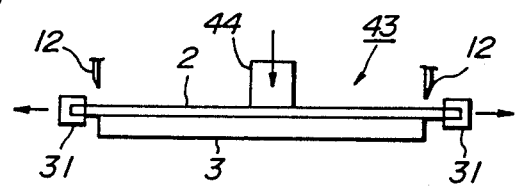
FIG. 26 is a schematic view showing another preferred embodiment of the cutting device which may be used to carry out the method according to the present invention.

When the shaped body 2 is formed by an extrusion process, an extrusion die block 40 may be used which is shown in FIG. 25. The die block 40 includes a first inlet 41 for the resin material of the shaped body 2, a second inlet 42 for the resin material of the ornamental portion 26, a third inlet supplied with a sheet forming the core element 25, and an outlet for the extruded continuous rod. The resin material for the ornamental portion 26 is usually different in color from that for the shaped body 2 to thereby achieve the desired ornamental appearance, though they should have a sufficient cross-solubility with each other. Thus, a soft polyvinylcholoride (PVC) resin, or the like resin, may be used advantageously. These materials are fed to the first and second inlets 41, 42 of the die block, and co-extruded from the outlet as a continuous rod 2A with the core element 25 embedded throughout the entire length, which rod is then cut into a predetermined length of the elongate shaped body 2.

Figure 27:
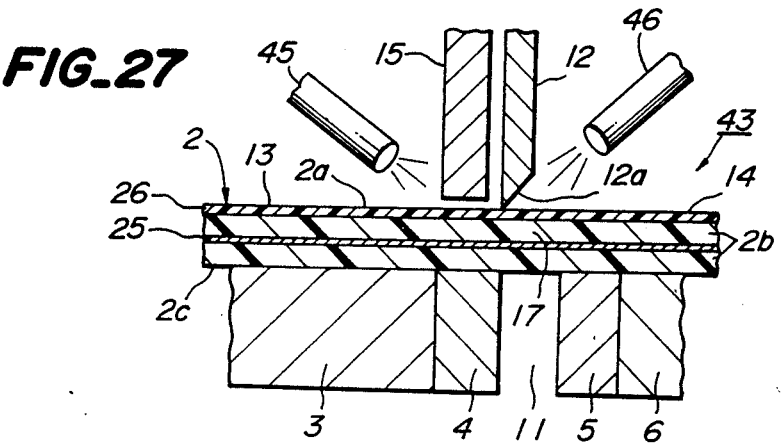
FIGS. 27 to 29 are sectional views showing the manner of carrying out the cutting step by means of the device of FIG. 26.
Figure 28:
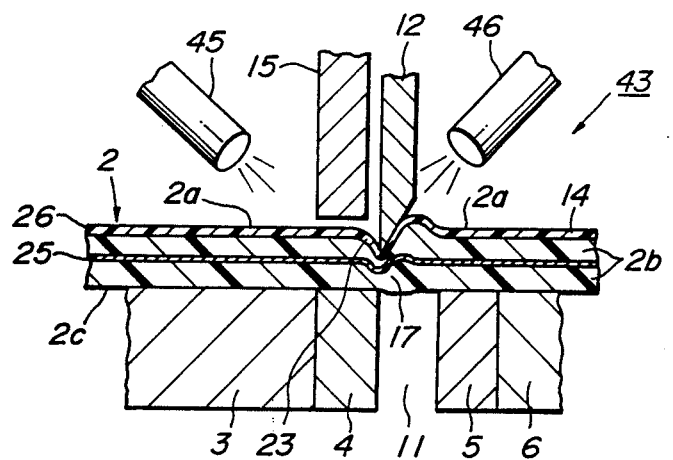
Figure 29:
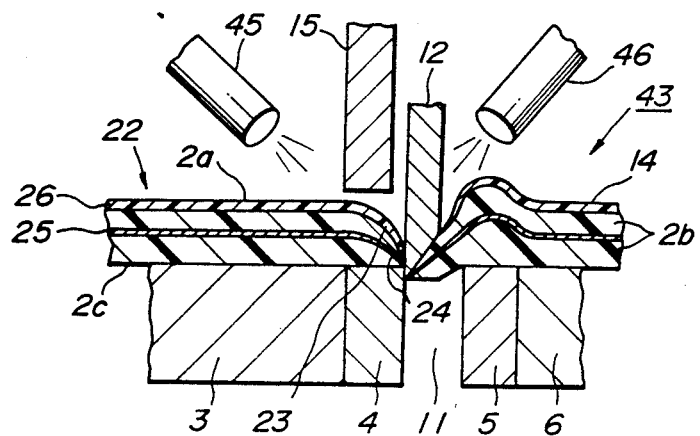

Each shaped body 2 is transferred to a cutting device 43 by which the desired cutting is carried out in essentially the same manner as in the above-mentioned embodiments. The cutting device 43 is shown in FIGS. 26 to 29, and is adapted to cut both end regions 14 of the shaped body 2 simultaneously. The cutting device 43 thus includes a single clamp member 44, movably arranged above the elongate support member 3 and adapted to clamp the shaped body 2 in its longitudinal center region, a pair of cutter blades 12, a pair of chucks 31 for clamping both ends of the shaped body 2 to apply tension thereto, and a pair of cooling air nozzles 45, 46 arranged on both sides of each cutter blade 12. When the shaped body 2 is subjected to the controlled high frequency dielectric heating as mentioned above, the cooling air discharged from the nozzles 45, 46 serves to cool the cutter blades 12 and the outer surface portion 2a of the shaped body 2 near its cut portions 17. This makes it possible to effectively preserve the hardness of the resin material forming the outer surface portion 2a, while the interior resin material undergoes softening as a result of the controlled heating. Provision of the cooling air nozzles 45, 46 as above is advantageous particularly when manufacturing molding members with substantial thickness. The cutting step, per se, is carried out in a sequence as shown in FIGS. 27 to 29, essentially in the manner described above.

Extrusion process may be used in combination with the method of the present invention, to manufacture various kinds of molding members as exemplified below. The molding member 22 shown in FIGS. 30A, 30B includes an ornamental portion which is formed of an outer layer 26A of a transparent material, and an inner layer 26B of the desired color. Thus, the inner layer 26B is protected by the outer layer 26A, and is visible from outside therethrough. The molding member 22 shown in FIGS. 31A, 31B includes a main body 22A composed of a foamed resin material, and an outer surface layer 22B composed of a non-foamed resin material. Thus, the molding member 22 is light in weight and can be produced less expensively. The molding member 22 shown in FIGS. 32A, 32B includes a main body 22A composed of an ordinary resin material, and an outer surface layer 22B composed of resin material with excellent weatherability and scratch-proof characteristic. Thus, molding members capable of achieving distinguished functional advantages can be produced less expensively. Lastly, the molding member 22 shown in FIGS. 33A, 33B includes a main body 22A composed of an ordinary resin material, as well as an outer surface layer 22B composed of an ornamental film or painted layer. The outer surface layer 22B may have a strip-like region with a metallic luster, as well as lusterless remaining region, which are combined with each other to provide an aesthetically refined appearance.

Figure 34:
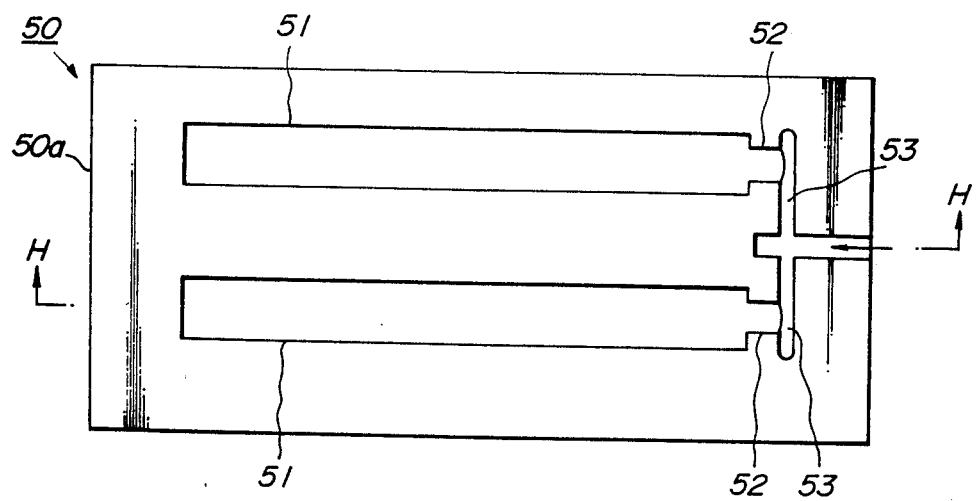
FIG. 34 is a perspective view showing an example of cavity plate of the injection mold which is adapted to prepare the elongate shaped bodies.
Figure 35:
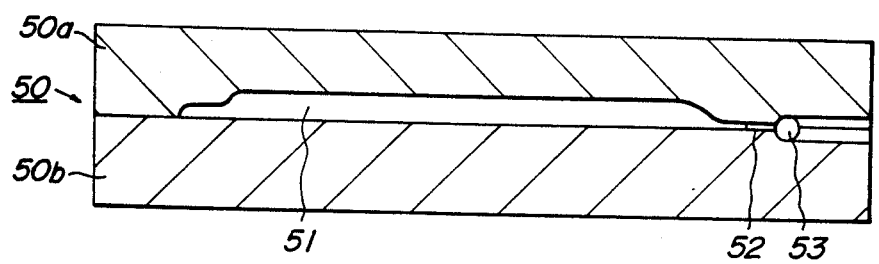
FIG. 35 is a longitudinal-sectional view of the injection mold taken along the line H—H in FIG. 34.

When the elongate shaped body 2 is prepared by an injection process, an injection mold 50 as shown in FIGS. 34 and 35 may be used which is composed of a cavity plate 50a and a core plate 50b. Between these plates 50a, 50b, there may be formed one or more sets of cavities 51, gates 52 and runners 53, the number of which, two in the illustrated embodiment, corresponds to the number of shaped bodies 2 to be prepared by a single mold 50 simultaneously. In operation, the two mold plates 50a, 50b are tightly superimposed with each other, so that the resin material can be introduced from the runners 53 and through the gates 52 into the cavities 51 to mold one pair of elongate shaped bodies 2.

Figure 36:
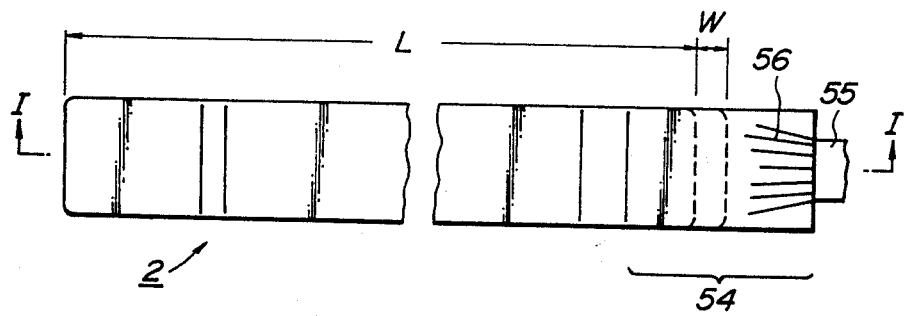
FIG. 36 is a top plan view of the shaped body prepared by the injection mold of FIGS. 34 and 35.
Figure 37:
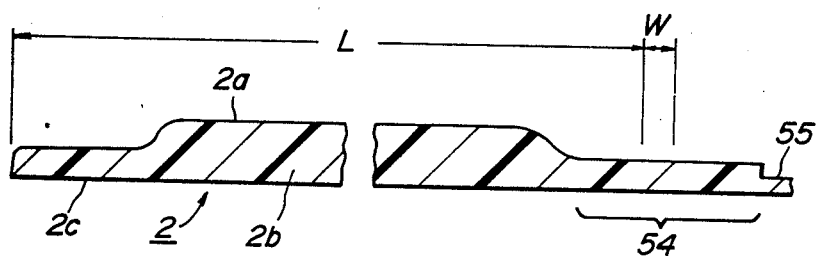
FIG. 37 is a longitudinal-sectional view of the shaped body taken along the line I—I in FIG. 36.

As shown in FIGS. 36 and 37, the shaped body 2 is prepared by the injection process so as to include a longitudinal end region 54 adjacent to its gate portion 55, with a substantially constant cross-section throughout its entire length. Although a so-called flow mark 56 of the resin material inevitably appears in the end region 54 as being connected to the gate portion 55, it is included in that portion of the end region 54 which is to be cut away.

Figure 38:
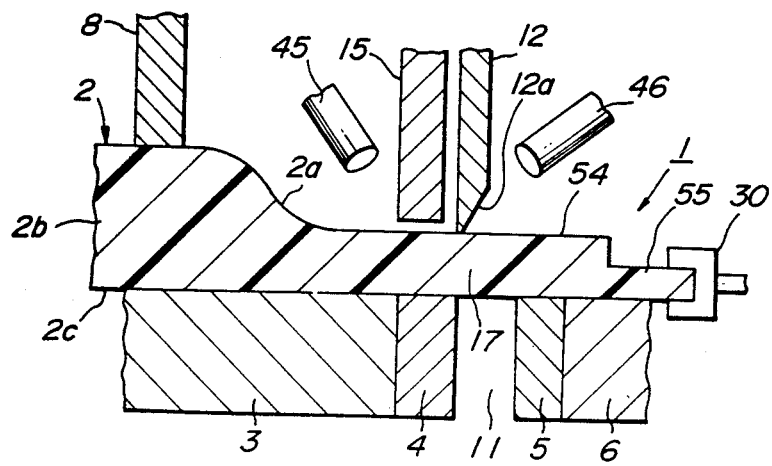

The shaped body 2 is then subjected to an annealing to relax the internal stress arising from the injection molding, as a result of which the shaped body 2 undergoes a shrinkage. The shrinkage length W differs in accordance with the physical properties of the resin materials and/or pigments which may be mixed into the resin material in order to realize the desired color. The shaped body 2 may be cut into the predetermined length L of the product, in its end region 54 with a constant cross-section, after the shrinkage of the shaped body 2 has been completed. When, on the other hand, it is required to carry out the cutting step in advance of the annealing, it is of course that the shaped body 2 has to be cut into a length (L+W) which is the sum of the final product length L and the above-mentioned shrinkage length W. The cutting step, per se, is carried out in a sequence as shown in FIGS. 38 to 40, essentially in the manner described above, by using the cutting device 1 and with the gate portion 55 of the shaped body 2 clamped by the chuck 30. The end region of the molding member 22 as the final product is shown in FIG. 41.

Application of the injection process as above, in combination with the method of the present invention, proved to be particularly advantageous in that it is readily possible to compensate for different shrinkage length of the shaped body when different resin material is used either alone or in combination, or when the resin material is mixed with different pigments, without requiring preparation of different injection molds.

It will be readily appreciated from the foregoing detailed description that, according to the present invention, the longitudinal end surface of the molding member can be formed in continuous connection with remaining outer surface thereof, by advancing the cutter blade into the shaped body while the latter is subjected to the controlled heating to have its interior region material heated above the softening temperature of the resin material, and to thereby form an outer surface portion which becomes higher in hardness than the interior resin material. The cut surface has a minimized surface area, where the outer surface portion substantially completely covers the interior resin material, is arranged substantially on the rear side of the molding member so that it is not visible from outside when the molding member is mounted in place. Thus, the present invention makes it possible to readily realize a refined appearance of the molding member without requiring a separate terminal end treatment and, hence, with an improved productivity.

What is claimed is:

1. A method of manufacturing molding members composed of a thermoplastic synthetic resin material, comprising the steps of forming said resin material into an elongate shaped body with a profiled cross-section corresponding to that of the molding member, and cutting the shaped body on at least one end into a predetermined length of the molding member;

wherein said shaped body is subjected to such a controlled heating that the shaped body has its interior portion heated above the softening temperature of the resin material whereby its interior portion becomes softer than its outer surface portion; and wherein a cutter blade is advanced into the shaped body while it is subjected to said controlled heating outer surface portion inwardly, without it being cut or ruptured by the blade, to form a curved end surface of the molding member which is continuous with the remaining outer surface, and subsequently cutting away the outer surface portion;

wherein the cut surface has a minimized surface area, and the outer surface portion substantially covers the interior portion and is arranged on a substantially rear side of the shaped body so as not to be visible from outside when the molding member is mounted in place.

2. The method as claimed in claim 1, wherein said controlled heating of the interior portion of the shaped body is effected by a high frequency dielectric heating while subjecting said outer surface portion to a cooling.

3. The method as claimed in claim 1, wherein said shaped body put under tension while said cutter blade is advanced from the outer surface portion into the shaped body.

4. The method as claimed in claim 1, wherein said shaped body is formed by an injection process.

5. The method as claimed in claim 4, wherein said shaped body as formed by the injection process has at least one longitudinal end region with a constant cross-section, and said cutting is effected with respect to said end region.

6. The method as claimed in claim 1, wherein said shaped body is formed by an extrusion process.

7. The method as claimed in claim 6, wherein said shaped body as formed by the extrusion process has said interior portion and said outer surface portion which are of different material from each other.

* * * * *

UNITED STATES PATENT AND TRADEMARK OFFICE
CERTIFICATE OF CORRECTION

PATENT NO. : 4,940,557
DATED : July 10, 1990
INVENTOR(S) : Kaoru KIMURA

It is certified that error appears in the above-identified patent and that said Letters Patent is hereby corrected as shown below:

Claim 1, line 14 (column 10, line 23,) after "controlled heating" insert --and force said--.

Signed and Sealed this

Twenty-sixth Day of October, 1993

Attest:

BRUCE LEHMAN

Attesting Officer

Commissioner of Patents and Trademarks